No. 715,201. Patented Dec. 2, 1902.
J. M. DALY.
SYSTEM FOR COMPUTING TONNAGE RESISTANCE IN RAILWAY TRAINS.
(Application filed Sept. 15, 1902.)
(No Model.)
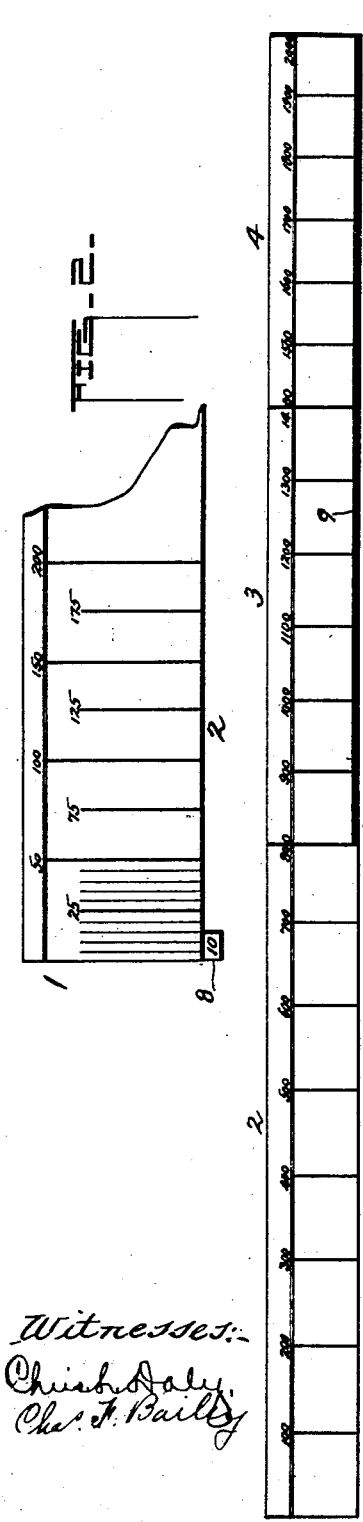
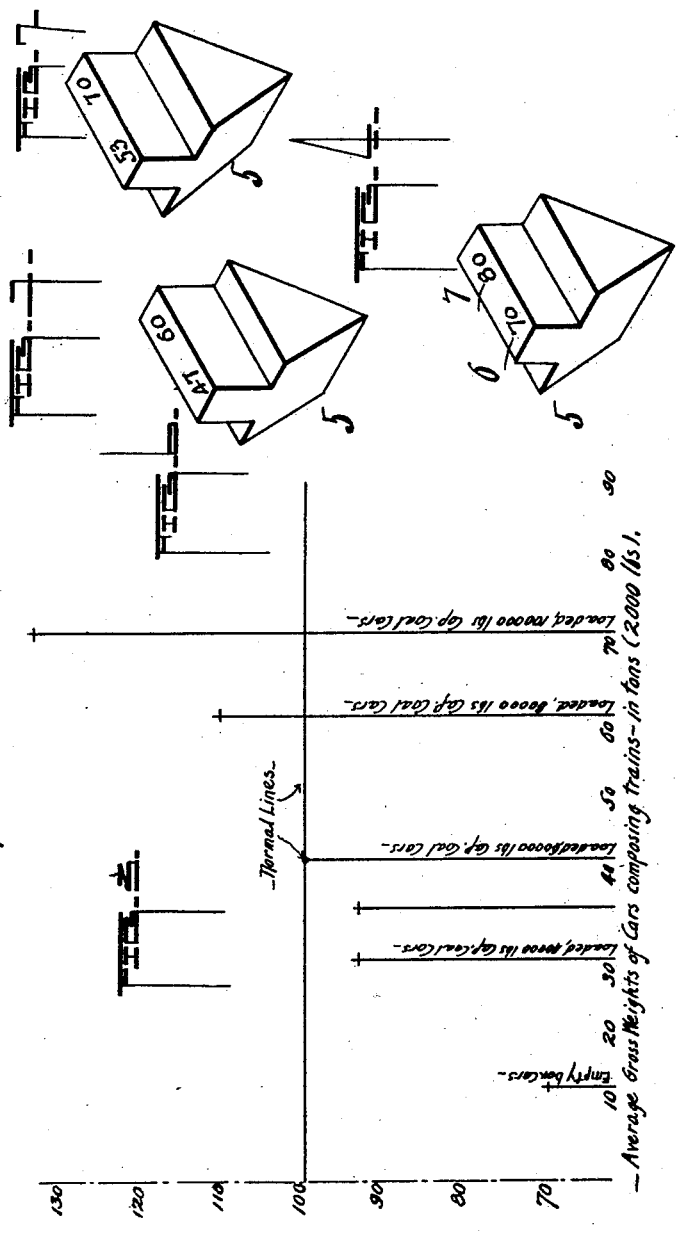
Witnesses:
Inventor,
John M. Daly,
By Tho. F. LaPorte.
Atty.

UNITED STATES PATENT OFFICE.

JOHN M. DALY, OF CHICAGO, ILLINOIS.

SYSTEM FOR COMPUTING TONNAGE RESISTANCE IN RAILWAY-TRAINS.

SPECIFICATION forming part of Letters Patent No. 715,201, dated December 2, 1902.

Application filed September 15, 1902. Serial No. 123,372. (No model.)

*To all whom it may concern:*

Be it known that I, JOHN M. DALY, a citizen of the United States, residing at Chicago, in the county of Cook and State of Illinois, have invented certain new and useful Improvements in Systems for Measuring Tonnage Resistance in Railway-Trains; and I do hereby declare that the following is a full, clear, and exact description of the invention, which will enable others skilled in the art to which it appertains to make and use the same.

This invention has reference to a system for measuring the tonnage resistance in railway-trains, and the application herein is similar in some respects to applications for patent now pending in my name bearing Serial Nos. 76,996 and 76,997, filed September 30, 1901, and Serial No. 86,184, filed December 18, 1901, and Serial No. 87,756, filed December 30, 1901.

In the several applications for patent above mentioned I have aimed to cover, first, a tonnage-chart of a graduated or shrinking scale; second, a chart similar to the graduated chart, but of a series of scales mounted upon a revoluble frame, and one or more per cent. of hauling-charts coacting with the tonnage-scales, and in the provision of a series of slugs or blocks, each having a number indicating arbitrary weights of cars which they represent and wherein the tonnage resistance in cars is measured without any provision being made for light-loaded or heavy cars or for increased resistance due to length of train or curve; third, a tonnage-chart having a fixed position relative to a revoluble frame on which is arranged a series of per cent. of hauling-charts, the tonnage-chart a uniform scale, and the per-cent. charts arranged with fixed signs for indicating to the operator the point in length of train where increased resistance becomes a factor, and coacting with said tonnage-scale and per-cent. charts I have provided blocks representing cars having two distinguishable numerals, one number of which is employed for measuring the tonnage resistance on the scale from "0" to a point thereon where the increased-resistance sign appears on the per-cent. chart, and here it is that the other number of the blocks are employed for measuring the resistance due to length of train, each block made of arbitrary lengths and based on a testing unit and the blocks expanded below that unit and contracted above that unit. The last-mentioned case aims to cover a fixed tonnage-chart and a sliding per cent. of hauling-chart, all of which points, it is believed, will be understood from a study of the aforesaid applications.

The object which I have in view in the present application is to provide a system for measuring the tonnage resistance of a train of cars where several ratings differing from each other are taken into account, all of which is hereinafter fully set out in the specification, claimed in the appended claims, and to a greater or less extent illustrated in the accompanying drawings, forming a part of this specification, in which—

Figure 1 is a view in outline of a tonnage chart or scale similar to that which I employ in my system, showing the uniform and contracted portions thereof. Fig. 2 is short strip, enlarged, of the uniform portion of the scale. Fig. 3 is a chart illustrating the pulling tests of engines. Fig. 4 is a perspective view of a slug or block similar to that employed in my system used in conjunction with the tonnage-chart for measuring the tonnage resistance in trains of cars. Figs. 5, 6, and 7 indicate car-blocks of certain capacity.

In the drawings I have illustrated, as will be seen from the figures, a tonnage-chart the scale of which is shown uniform and contracted. This tonnage-chart is based on a center or testing unit determined in manner substantially as I have described for the mode of testing railway-divisions set up in application Serial No. 86,184, by means of which a basing unit is provided, whereby it is made possible to represent by blocks or slugs cars of certain tons hauling capacity, and if the basing unit is forty tons all blocks representing cars under forty tons have an arbitrary length, or, in other words, expanded, and all blocks representing cars above the unit are contracted. All blocks which represent cars under the basing or testing unit are provided with one number, and all blocks representing cars above the basing unit are provided with two numbers, the blocks being numbered to represent cars of a given capacity and are selected and employed in manner described for measuring the tonnage resistance in trains of cars as taken from way-bill when making up a train.

The scale employed herein is based on tons as taken from way-bills, which I reduce to resistance or draw-bar pull by the combined means of the scale and blocks, and by the use of a variable scale I am enabled by one indicator, such as herein shown, to find the resistance in trains of cars both light and heavy loaded—that is to say, when setting in a train of cars that is light loaded, or cars of tons below the basing unit when placed alongside of the uniform portion of the scale, the expansion of the blocks will indicate upon the chart the resistance over and above the actual tons of cars and contents, and if the length of train is such that the blocks will coincide with any part of the contracted portion of the chart by reason of such contraction the increased resistance due to length of train in light cars is indicated readily upon the chart. Attention is directed to this manner of showing increased resistance in length of train on light cars, as it is just the opposite for heavy cars.

In making up a train of heavy cars—that is, of cars above the unit—as they are placed alongside the chart for measuring their resistance the number thereon representing tons in car and contents is used adjacent to the uniform scale, but will show a less resistance on the scale than is indicated by the number on the block by reason of the contracted allowance, as above stated, in cars above the unit, for the reason that there is less resistance in heavy cars of a given number of tons than there is in a train of cars of a like number of tons, but of light-weight cars, as the length of train in a case of this kind becomes a factor. In this connection I wish to call attention to the mode of numbering blocks designating cars above the basing or testing unit, by means of which I am enabled to employ a minimum number of slugs or blocks in connection with my system, which not only reduces the cost of production, but makes the device more compact. The blocks representing cars above the unit I provide with two numbers, each of which represents actual tons in car. One number I prefer to make black and the other number in red, which may be printed on a slip of paper and pasted on the block or impressed or otherwise suitably attached thereto. The black number I employ in connection with the uniform scale when making up trains of cars as called for on way-bills, which in this instance is from "0" to "800," and the red number is employed in connection with the contracted portion of the scale, which in this instance extends from "800" to "2,000," and on this portion of the scale I provide a suitable sign indicating to an operator the point where it is designed to employ the red numeral, which represents tons in car as called for on way-bills when placing a car of tons above the basing unit adjacent to any portion of the contracted scale.

In Fig. 4 is shown a block representing a car of seventy tons in black or eighty tons in red. If a way-bill called for a seventy-ton car to be placed in a train and it would show adjacent to the uniform portion of the scale, this block would be used and its arbitrary contracted length would register thereon a little more than fifty tons, as the resistance in a seventy-ton car in a train at this point would measure less resistance than a number of light cars representing the same number of tons, due to increased length and other frictional resistance. Now, then, if in making up a train a way-bill should call for an eighty-ton car to be placed in train at any point adjacent to the contracted portion of the scale the operator would select a block similar to the one just described having the seventy in black and eighty in red; but the eighty represents the car now called for by the way-bill. By reason of providing a scale having a uniform and contracted portion to adapt it to light and heavy cars when providing a block representing a heavy car we must first provide an arbitrary reduction in the length of the block to compensate or equalize for the reduction made by the contracted portion of the scale, (which is made to show the increased resistance due to length of train and other frictional resistance when making up a train entirely of light cars,) and, second, shrink the block an additional per cent. to provide for the reduced resistance of heavy cars as they are added to train after reaching the "800" point, for the reason that the resistance, as above stated, is less and less in a long train of heavy cars as compared to a long train of light cars which may contain in the aggregate the same number of tons as the train of heavy cars, but will be greatly increased in length, which adds increased resistance due to such extreme length of train and other frictional resistances—such as curve, flange, &c.—and by such provision of the contraction in heavy car-blocks I am enabled to use one block for two purposes. A "50," "60," "70," and "80" in red, and so on above, by reason of its double reduction as used in connection with the contracted scale, enables me to use the same blocks by giving them an additional number in black to be used in connection with the uniform portion of the scale, attention being called to Figs. 5, 6, and 7, which show, respectively, a fifty, sixty, and seventy ton car block in red, which are designated in black "40," "47," and "53." The blocks all the way from ten tons up to the basing unit may be numbered to suit the basing unit and the same plan followed in blocks representing cars above the unit and the said blocks expanded or contracted, as may be deemed advisable.

As an example of the operation of my system on a two-thousand-ton test, the scale of which is shown in Fig. 1, we will assume that the basing unit is a thirty or forty ton car and all cars below this unit represented by blocks, the blocks are expanded in length and the cars above the unit represented in the blocks are contracted, so that a ten-ton car, if placed alongside the chart, and for convenience I have shown one placed adjacent to the scale between the points "0" and "800," and it measures approximately fifteen tons resistance. This same car placed in train between the points "800" to "1400" will show approximately a ten-per-cent. increase due to length of train which is provided by the contracted portion of the scale, and if placed in train between the points "1400" to "2000" it will show an approximate increase of twenty per cent., for the reason, as will become apparent, that the greater the tons-rating of an engine the harder it is to haul its rating in light cars on account of length of train. In showing the opposite effect of a car-block above the unit, by placing a seventy-ton car on the uniform scale, by reason of its arbitrary contraction it will show measuring only fifty-three tons on the scale—that is, between the points "0" and "800." Attention is directed to the preceding paragraph how I employ blocks representing cars above the basing unit and their arbitrary contraction to compensate for the contraction of the scale and the reduction in resistance, as is apparent in trains consisting of heavy cars. If in making up a train it would require both light and heavy cars, all blocks representing cars above the unit as taken from the way-bills would be placed in train nearest to the power, adjacent to the uniform scale, and place in the light cars farthest away from the power, or adjacent to the contracted scale, by means of which the increased resistance due to length of train could be very easily accounted for by reason of the fact that the contracted portion of the scale, as herein indicated, is provided for that purpose.

In Fig. 3 I have shown for comparison a chart illustrating to some extent the pulling test of engines, and in describing the same give a better idea of my method of obtaining true resistance of train of large and small cars, variously loaded or empty.

The following is a brief explanation of my way of ascertaining the unit basis of engine rating: Let the average unit-load hauled in each direction in cars varying from ten to seventy tons, gross weight, be, say, forty tons. Make up train for testing in which each car shall weigh forty tons, gross weight, thus giving uniform resistance per ton moved instead of using a mixed lot of differing weights the resistance of which is of variable quantity, since very rarely would such a test-train be exactly duplicated in practice. If, then, an engine using its maximum power can pull a train made up of twenty-five (25) forty-ton cars over its division and within its schedule time allowance its rating is thereby fixed at one thousand tons. The result of this test will be fully understood from an examination of the chart in Fig. 3, wherein it shows an engine hauling one hundred per cent. of forty-ton cars. This same engine will haul seventy per cent. of ten-ton cars, approximately ninety per cent. of thirty-ton cars, and will haul in the neighborhood of one hundred and ten per cent. of sixty-ton cars or one hundred and thirty per cent. of seventy-ton cars. This is in train of cars of an average gross weight of two thousand tons.

Under the old method, first, when an engine is rated one thousand tons by a test-train of twenty-ton cars, hauled with maximum power and in minimum time, if in service it happens to haul seventy-ton cars the railway company loses from thirty-three to forty per cent. of its potential earning power, and, second, if under like conditions the test-train is made up of seventy ten-ton cars the engine cannot haul one thousand tons, gross weight, made up with twenty-ton cars, and if so loaded the train will be stalled and otherwise delayed.

Having shown how I determine an engine's rating by a standard train, it is necessary in order to properly load the engine to apply certain corrections for difference in train resistance of cars of greater or less capacity than the standard units, which I accomplish as follows: The correct resistance (expressed, of course, in car-tons) of the train on leaving terminals is found by the yard officer and between the terminals by the conductor not by entering on book or in report the separate weight of each car and its contents, footing the total and then making an arbitrary allowance or deduction for light and heavy cars, but by actually measuring the resistance automatically as each car is added to train, using neither pencil nor paper, but instead slugs or blocks, as set out above and the application referred to, each representing a car, and made, by scale of differing lengths, according to the corrected tonnage-rating weight of each car and contents. The tonnage rating of a train can thus be very quickly and accurately obtained by the use of an apparatus of suitable construction, in which error of calculation is wholly eliminated. The details of the case containing the charts, and for the reception of the slugs are not shown herein, as they are fully illustrated and described in the previous application mentioned.

I will now proceed to describe the figures of the drawings, the charts (indicated as 1) having the uniform portion 2 and the contracted portions 3 and 4, and for convenience the scale is shown as the same would be on a chart, the tons-hauling capacity of an engine adapted to said chart being two thousand tons. The scale may be of any suitable material and attached in any suitable way to a case similar to those shown in previous applications or to any other device adapted for the purpose herein, and the numbers of tons on the chart in their successive order are provided by lines or other devices and numerals indicating the increased tonnage of the lines or other devices as they appear on the chart. Between the points "0" and "800" the scale is shown uniform, and between "800" and "1400" the scale is shrunk a certain per cent. as compared with "0" to "800," and between the points "1400" to "2000" the scale is shown shrunk an additional per cent. as compared with "0" to "800."

In Fig. 6 the slugs shown therein are in form similar to those which I employ in previous applications and here will be referred to as 5, having the black number indicated as seventy tons and referred to as 6 and the number "80" referred to as 7 increased a certain per cent. over the black number for the purposes herein, and 8 indicates a slug or block representing a car below the basing unit and has the arbitrary number of tons indicated thereon, which is ten.

On the chart in Fig. 1 is shown an indicating-sign 9, herein represented by a heavy line which extends along the base of the chart from point "800" to "2000." It is designed to have this line in red, corresponding to the additional color on the heavy-ton car-blocks, indicating to the operator the point on the scale where the color on the block corresponding to the color-sign on the scale is brought into play. It is understood that I may employ any other color than red for the sign 9.

While I have shown and described blocks having one and two numbers respectively of arbitrary lengths, I wish it understood and I want to cover blocks which may be uniform or have arbitrary lengths with reference to the tons of cars which they represent and be provided with one or more numbers, as I may find it convenient in the application of my device to employ such blocks.

Having thus fully described my invention, what I claim, and desire to secure by Letters Patent of the United States, is—

1. A chart or scale for the purposes set forth, having a uniform portion and a graduated portion, substantially as described.

2. A chart or scale for the purposes set forth, having a uniform portion and varying graduated portions as compared with the uniform portion, substantially as described.

3. A chart or scale for the purposes set forth, arranged with devices or signs to designate tonnage, a given number of said signs spaced uniformly apart from each other and the additional signs of the scale having the intervals between the same reduced or contracted in proportion as the scale increases, substantially as described.

4. A scale or chart for the purposes set forth, having a uniform portion, and the remainder thereof divided into one or more graduate portions, one or both of which being shrunk a certain per cent. as compared to the uniform portion of the scale, substantially as described.

5. A system for measuring the tonnage resistance of railway-trains, comprising a tonnage-scale having uniform and graduated portions, slugs coacting with said scale having arbitrary lengths and provided with a character or numeral, for the purposes set forth.

6. A system for measuring the tonnage resistance of railway-trains, comprising a chart or scale having signs, a portion of which are spaced uniformly apart and a succeeding series of signs, the spaces between which are shrunk a certain per cent. as compared to the uniform portion, and suitable devices coacting with said scale having arbitrary lengths and provided with a numeral, the devices when coacting with the uniform scale indicating a given number of tons of resistance, and when coacting with any parts of the graduating portion of the scale indicating a certain per cent. increase, of resistance, the scale graduated for this purpose, substantially as described.

7. A system for measuring the tonnage resistance of railway-trains, comprising a scale or chart having signs, a portion of which are spaced uniformly apart and the succeeding portion of the scale shrunk a certain per cent. as compared with the uniform portion, suitable devices coacting with said scale made in arbitrary lengths having two distinguishable numerals both of which indicate tons in car represented by the devices, one number employed in connection with the uniform scale, and the other employed in connection with the contracted scale, substantially in manner and for the purposes set forth.

8. A system for measuring the tonnage resistance in railway-trains, comprising a chart having a uniform and a shrinking scale based on a testing unit as herein provided, and combined therewith suitable devices, some of which have one number and others two numbers, the devices having one number representing cars, of tons, below the basing unit being expanded, and the devices having two numbers which represent cars, of tons, above the basing unit doubly contracted or reduced a given per cent. to compensate for the shrunk portion of the scale and to provide for the reduced resistance in cars representing tons above the basing unit when employed in connection with the shrinking scale, substantially as and for the purpose set forth.

9. A system for measuring the tonnage resistance in railway-trains, comprising a chart having a uniform and shrinking scale based on a testing unit as herein provided, and combined therewith suitable devices made in arbitrary lengths and having one or more numbers, the devices containing one number representing cars, of tons, below the basing unit, and the devices containing more than one number representing cars, of tons, above the unit.

10. A system for measuring the tonnage resistance in railway-trains, comprising a chart having a uniform and shrinking scale based on a testing unit as herein provided, and a color-sign on the scale extending the length of the shrinking portion, and combined therewith suitable devices made in arbitrary lengths having one and two numbers, the devices provided with two numbers having one of said numbers in color corresponding to the color-sign on the scale, all arranged and employed substantially for the purposes herein set forth.

In testimony whereof I affix my signature in presence of two witnesses.

JOHN M. DALY.

Witnesses:
A. P. HUMBURG,
HARRY L. FEARING.